Dec. 11, 1923.　　　　　　　　　　　　　　　1,477,423
J. BUCHANAN
APPARATUS FOR MAKING CHILLED CASTINGS
Filed Sept. 3, 1920　　　　4 Sheets-Sheet 1
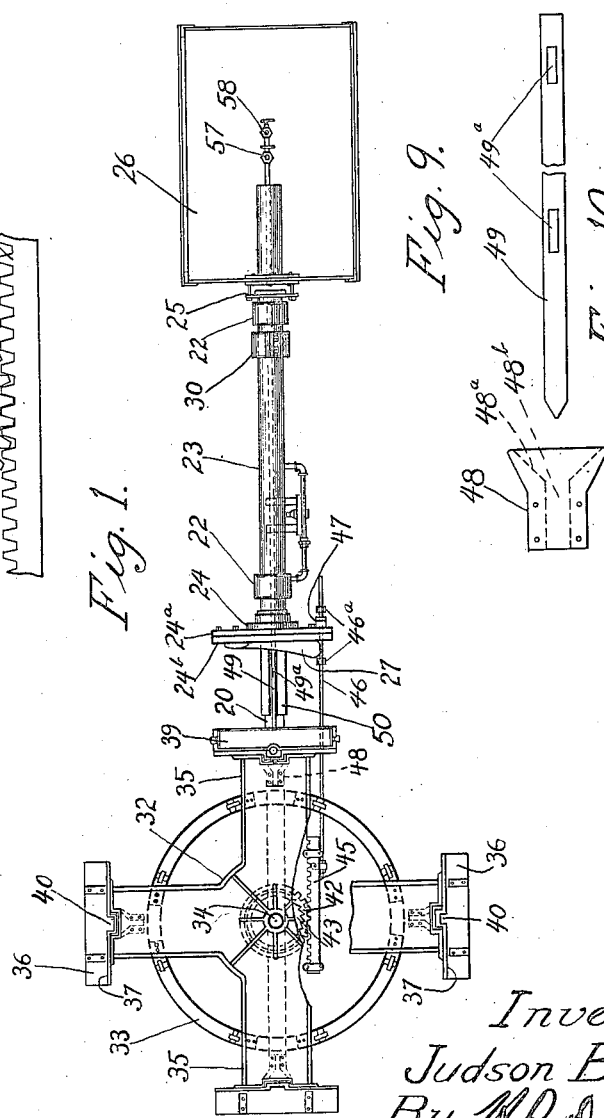
Inventor:-
Judson Buchanan,
By W.P. Doolittle
Atty.

Dec. 11, 1923. 1,477,423
J. BUCHANAN
APPARATUS FOR MAKING CHILLED CASTINGS
Filed Sept. 3, 1920   4 Sheets-Sheet 2
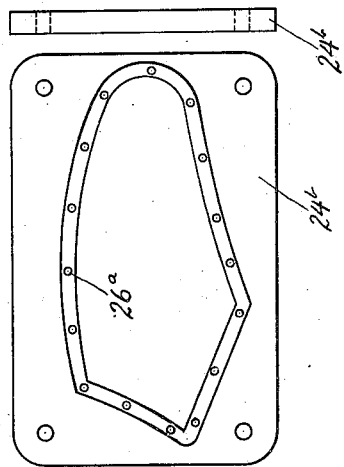
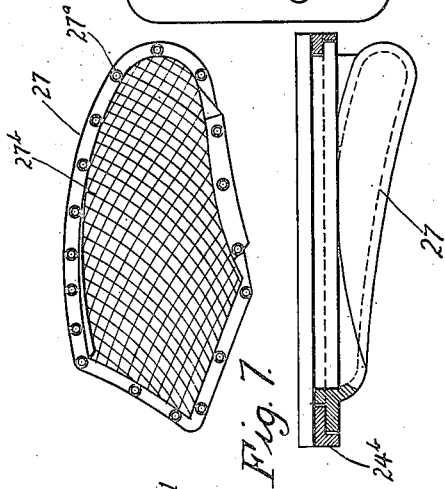
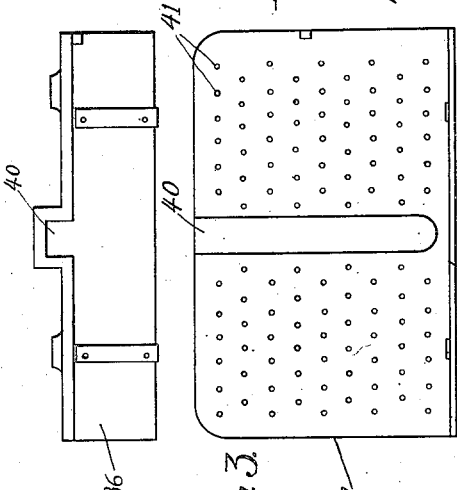
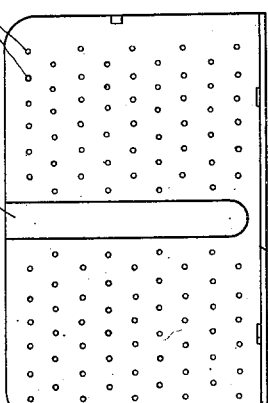
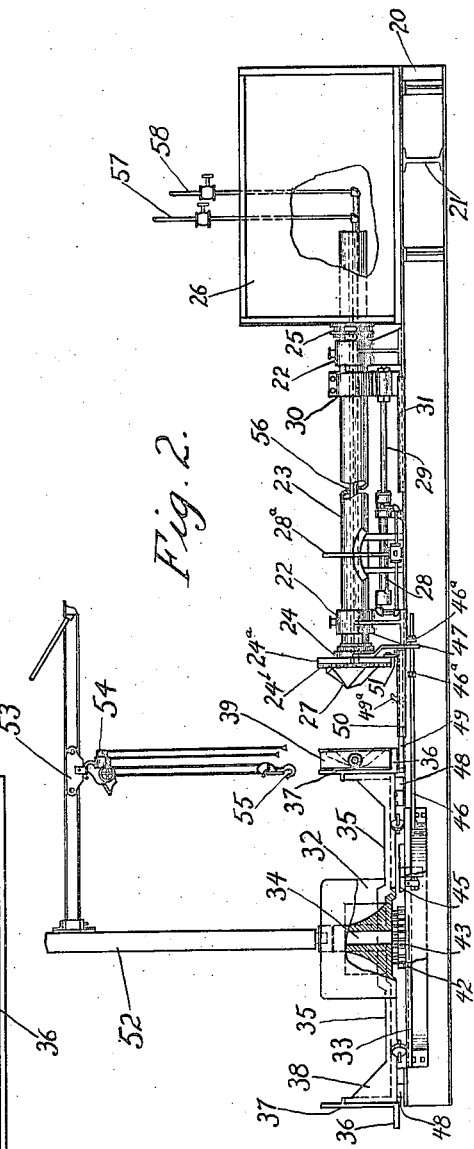
Inventor:-
Judson Buchanan,
By W.P. Dealick
Atty.

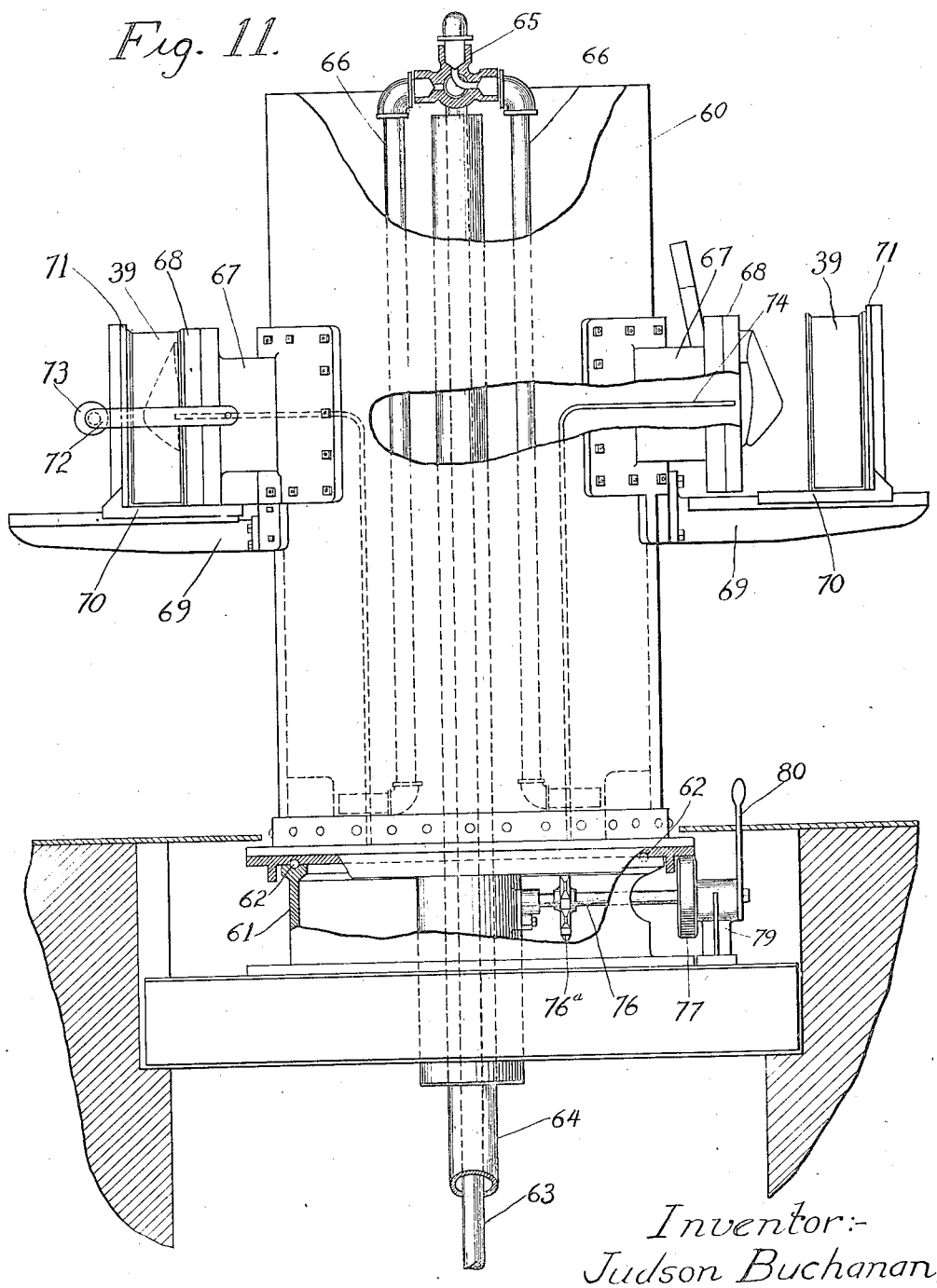

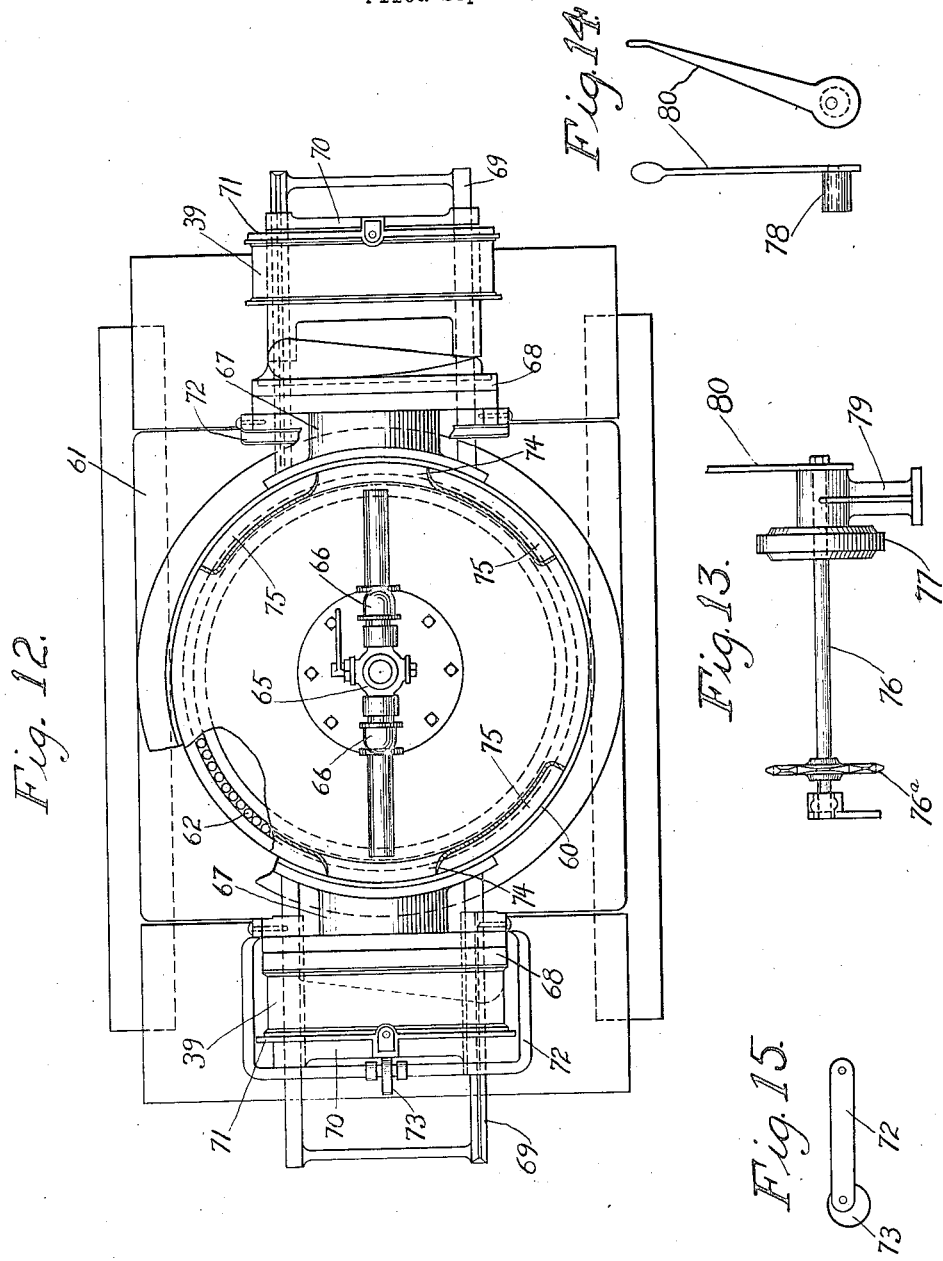

Patented Dec. 11, 1923.

1,477,423

UNITED STATES PATENT OFFICE.

JUDSON BUCHANAN, OF CHATTANOOGA, TENNESSEE, ASSIGNOR, BY MESNE ASSIGNMENTS, TO INTERNATIONAL HARVESTER COMPANY, OF CHICAGO, ILLINOIS, A CORPORATION OF NEW JERSEY.

APPARATUS FOR MAKING CHILLED CASTINGS.

Application filed September 3, 1920. Serial No. 407,850.

*To all whom it may concern:*

Be it known that I, JUDSON BUCHANAN, a citizen of the United States, residing at Chattanooga, in the county of Hamilton and State of Tennessee, have invented certain new and useful Improvements in Apparatus for Making Chilled Castings, of which the following is a full, clear, and exact specification.

My invention relates to the manufacture of chilled castings and particularly to a process and apparatus for producing such castings, especially flat castings such as chilled mold boards for plows, in which one side or surface of the casting is to be chill hardened.

The objects of my invention are to provide means whereby any number of uniform chilled castings can be produced in quick succession from molds composed of a permanent chill portion and a series of interchangeable matrix portions, which are preferably formed in sand, thereby increasing the speed and decreasing the cost of production, and to embody such means in a machine that will be simple and sure in operation and require the minimum use of manual labor.

I attain these objects by employing novel apparatus including a revoluble support or turret carrying seats adapted to receive iron flasks containing the sand portion of a mold and by employing, as the other half of the mold, a permanent section containing the chill and fitting the series of iron flasks with each of which it is adapted to cooperate to form a complete mold, the permanent section having associated with it, means, such as a water circulating system of novel type, for maintaining an equable temperature in the chill; and by so arranging these elements that a number of duplicate sand mold sections can be brought successively into cooperation with the chill section to form the mold, any number of castings, each an exact duplicate of another, being thus capable of production at a rate of speed limited only by the time required for each casting to set and chill, and that required to remove and replace the flasks containing sand portions of the mold for the casting being produced.

With the above main and other incidental objects in view, my invention consists of the organization, details of construction, parts, or their equivalents hereinafter described, and more particularly defined in the claims.

Having reference to the drawings:

Fig. 1 is a plan view of one form of machine embodying the principles of my invention.

Fig. 2 is a side elevation of the same.

Fig. 3 is a detail front elevation on an enlarged scale of one of the flask seats.

Fig. 4 is a plan view of the same.

Fig. 5 is a detail front elevation and edge view on an enlarged scale of the chill frame or seat.

Fig. 6 is a face view of the chill on an enlarged scale.

Fig. 7 is a top view of the chill seat and chill with edges in section.

Fig. 8 is a detail of the rack and pawl drive used in connection with the flask support.

Fig. 9 is a plan view on an enlarged scale showing a centering lock used on the machine.

Fig. 10 is a side view of the same.

Fig. 11 is a side view of a modified form of machine embodying the invention.

Fig. 12 is a plan view of the same.

Fig. 13 is a detail view of a drive device used.

Fig. 14 is a detail view of the control lever for the drive device viewed from the edge and side.

Fig. 15 is a detail view of a cam lock used in connection with the molds.

In the construction disclosed in Figs. 1 to 10 my invention comprises a main support for both sections of a two-part mold, the supports for the two mold sections being mounted on said main base or support, which may consist of a heavy I-beam 20, Fig. 2, suitably braced as by a cross-piece 21. One mold support carries the chill section and comprises a pair of bearing standards 22 suitably spaced from each other and secured to the top of the I-beam 20. In these standards is mounted a plunger comprising a tube 23 which has its outer end opening into a hollow head 24 on which is the chill seat to be described. The inner or opposite end of the tube slides in a stuffing box 25 in the side of a tank or reservoir 26 also mounted on I-beam 20 into which the tube projects for some distance. This tube 23 is mounted to reciprocate in the bearing standards 22 and stuffing box 25 and suitable power mechanism is provided for moving it. This may be of any of several types of motors and as one example, I have shown a cylinder and piston 28 mounted on the I-beam 20 and having the usual valves and connections controlled by a four-way valve and lever 28$^a$ constituting a mechanism for use with compressed air, water or steam as a fluid pressure motor. The piston carries the piston-rod 29 which is secured to a clamp 30 fixed to the tube 23 and guided on the I-beam 20 in a track 31, whereby the piston and plunger or tube 23 must reciprocate together.

The hollow head 24 includes plate 24$^a$ which forms a back plate for the chill frame 24$^b$ which is securely bolted to it and provided with a gasket to prevent escape of fluid. The back plate 24$^a$ has a central opening into tube 23 and the chill frame 24$^b$ has an opening conforming in shape with and adapted to receive the chill 27,— in this case shaped to form the face or working surface of a mold board.

The chill frame 24$^b$ and chill 27 are formed with attaching flanges provided with registered apertures 26$^a$ and 27$^a$ and both the apertures and the opening in the chill frame are formed oversize to permit room for expansion and contraction of the chill under changes of temperature occurring during operation. The face of the chill is preferably provided with shallow intersecting grooves 27$^b$ to act as vents.

The second mold support consists of a revoluble body or turret 32 which turns on a vertical post 34 and rides on a circular track 33 fixed on the I-beam 20, around the axis of the bearing post 34. The turret may be formed with two or more radial extensions 35—four being shown in the present instance. Each of these extensions terminates in a flask support or seat formed with a horizontal flange or bench 36 and a vertical portion or back 37, suitably braced on the turret as by a web 38. The flask supports are intended for the reception of iron flasks such as 39, containing the other half or matrix portion of the mold, formed in green sand. This flask corresponds to the drag and has its base or bottom resting against the vertical plate 37. For the purpose of providing a gate for the mold, the plate 37 is formed with a vertical groove 40 in which the gate is formed in green sand and suitable vent holes 41 are provided in plate 37 for escape of gases.

It is intended that the turret shall be rotatable to bring the flasks in position opposite the chill section of the mold successively and in order that this may be accomplished automatically, I provide a gear wheel 42 loose on post 34 and a ratchet wheel 43 just above it, which is secured to the base of the turret 35. A spring pressed pawl 44 is mounted on the upper face of gear wheel 42 in position to engage the teeth of ratchet 43 in a manner to cause both the gear and ratchet to turn together in counter-clockwise direction, whereas the gear wheel runs loosely in the opposite direction. The gear wheel 42 is in mesh with a rack 45 slidably mounted in suitable bearings beneath the turret and secured to a rod 46 extending to the chill support. The back plate 24$^a$ of the chill support carries a downwardly extending arm 47 which has an aperture in which the end of rod 46 is movable and spaced stops 46$^a$ are fixed to the rod on opposite sides of arm 47. It follows from this arrangement that reciprocation of the tube 23 by motor 27 will cause arm 47 to come in contact with one and then the other of the stops 46$^a$ and thus reciprocate the rack 45. On forward movement of the tube 23, the rack will turn the gear wheel 42 idly, but on retraction, contact of the arm 47 with the rear stop 46$^a$ will cause gear 42 and ratchet 43, and consequently the turret, to be turned in a counter-clock-wise direction through an angle of 45°, thereby bringing the succeeding flask support into position opposite the chill support, the adjustment of stops 46$^a$ on rod 46 being such as to give the turret 35 the exact angular movement desired.

In order to insure proper alingment of the mold sections and to lock them in position while joined, some device must be provided to properly center the sections, as for example, a socket 48 secured beneath each flask support and formed with an inlet having flaring edges 48$^a$ (Fig. 9) leading to a channel 48$^b$ which corresponds in width to a bolt member 49 slidably mounted on the I-beam in a runway 50 and provided with upwardly projecting spaced contact lugs 49$^a$. These contact lugs are positioned on opposite sides of the chill seat, the back plate of which carries a downwardly projecting lug 51 in position to engage lugs 49$^a$. With this construction, the bolt 49 will be moved toward socket 48 during approach of the mold sections and if their alignment is not exact, contact of the bolt with the flaring edges of the socket will cause it to center the flask supports and assure accurate joining of the mold.

It is necessary to provide some form of hoist for seating and removing the flasks on their supports, and as one form of such a device, I have shown a jib crane 52, which may be pivoted on the standard 34 and which has the trolley 53 carrying an ordinary pulley hoist 54 provided with hooks 55 for engaging the trunnions on the ends of the flasks.

As it is necessary to heat the chill in order to drive off moisture before casting is begun and as the chill would tend to become overheated through constant use, I provide a means for maintaining proper temperature therein, which means consists of a partition plate 56 (Fig. 2) which extends the entire length of the tube 23 and to a point within the chill frame 24^b and divides the tube into equal upper and lower chambers. In the lower chamber there extends pipes 57, 58, connected with a hot and cold water or similar fluid supply respectively and these pipes have their ends just within the chill frame. This arrangement permits the tank 26 to be supplied with hot water which passes into tube 23 and into the chill support and warms the chill to the proper temperature for casting. As the casting progresses the chill becomes heated and it becomes necessary to cool the chill and maintain it at the proper temperature for casting. For this purpose cool water may be introduced through the other pipe in proper quantity and the temperature of the water and chill reduced and circulation behind the chill face caused by its flow. Obviously, a single pipe with valve controlled connections to sources of hot and cold water could be substituted.

In the modified machine shown in Figs. 11 and 12, a tank or reservoir 60 is revolubly mounted on a base 61, beneath the floor level, on which it is supported by a ball race 62. At its axis the bottom of the tank receives two concentrically arranged pipes 63, 64, the inner one of which connects to the top of the tank with a three-way valve 65 opening into downwardly extending branches 66, which extend almost to the bottom of the tank and end in short lateral extensions, while the outer pipe constitutes an overflow. At diametrically opposite points in its side, the tank has laterally extending tubular members 67 fixed to it and these terminate in hollow heads and chill seats 68 similar in construction to those above described.

Beneath each tubular member and chill seat there is secured to the tank side a horizontal support or bench 69 carrying a slidable seat 70, which has a vertical back plate 71 formed with a gate groove and vents similar to those in the back plate 37 of the other machine. These seats receive the flasks 39 in the same way as in the machine first described and they are then moved into contact with the chill seat and the two locked together by a bail 72 which is pivoted to the chill seat and which carries an eccentric roll 73 positioned to engage the rear of the back plate and force the sliding seat and flask firmly against the chill section of the mold.

To provide circulation of fluid in the chill supports, there is provided a partition plate 74 which divides the tubular extension 67 into upper and lower chambers and then extends downwardly within the tank forming an enclosed circulating chamber 75 which extends to the bottom of the tank where an opening is provided to receive a jet of fluid coming from the laterally extended end of the pipe 66. This arrangement results in the jet from pipe 66 forcing fluid into the circulating chamber where it passes upwardly into the lower chamber of the tubular member, behind the chill, and back into the tank through the upper chamber. By means of valve 65, the fluid may be directed to either chill.

As an example of means for causing rotation of the tank, I have shown a drive shaft 76 mounted in suitable bearings beneath the tank and driven by sprocket 76^a and having fixed thereto a friction pinion 77. In its outer bearing the shaft turns in an eccentric sleeve 78 mounted in the journal bracket 79 and this sleeve has a lever 80 extending upwardly into position to be reached for operation. It will be evident from this construction that movement of the lever 80 will turn the eccentric sleeve and bring pinion 77 into engagement with the under edge of the base and cause the tank to rotate to the extent desired.

To practice my invention with the machine of Figs. 1 and 2, a series of flasks, corresponding to the drag of an ordinary mold, containing the sand section of the plow mold board or other casting being made, are prepared, usually in green sand from a pattern in the usual way, some form of sand tamping machine being preferably used to speed preparation of the flasks. The flasks containing the sand section of the mold are then mounted on the seats of the revoluble support where they rest in vertical position with one side on the horizontal ledge and the back or bottom against the back plate of the seat, the back plate having the channel in which the gate is formed in green sand. The chill support is then operated and the chill section, previously heated to proper temperature, advanced until in contact with the sand section, forming the mold, proper alignment being assured by the centering elements. The mold is then cast and after the required time for setting and chilling usually about forty seconds, the chill support is retracted, thereby giving the revoluble support a quarter turn in a counter-clockwise direction. This brings a new hand section opposite the chill and carries the flask containing the casting just poured around to one side where the casting is taken out and the flask removed by the hoist and dumped. On the next quarter turn the seat on which the first flask was supported is diametrically across from the chill and there receives a new flask and gate which in turn is brought around to the chill to be cast.

During the casting process, the chill which was initially heated by circulation of hot water from the tank may tend to become overheated and this is counteracted and the chill maintained at a substantially equable temperature by causing a jet of cold water from pipe 58 to escape in the chill-head thereby cooling and circulating the fluid in the chill-head, tube and reservoir.

Essentially the same mode of operation is followed with the modified machine of Figs. 11 and 12, but in that form at least two permanent chill sections of the mold are used. The sand sections of the mold are prepared at one side of the machine and placed on the movable seat 70 on bench 69 and the mold closed by moving the seat towards the chill and bringing bail 72 down. The driving mechanism is then thrown in and the machine given a half turn bringing the mold just prepared to the opposite side of the machine where it is poured and, after the proper interval, opened and the casting taken out and the flask removed and dumped. Meanwhile, another mold has been prepared on the opposite bench which is brought to position for pouring on the next turn. As in the other form of machine, the chills are first heated by hot water in the tank and afterwards maintained at an equable temperature through circulation of water around the partition in the chill head under the influence of a jet of water or other cooling fluid from pipe 66, the valve 65 permitting the jet to be shifted from one side to the other.

This species of the invention has the advantage of occupying less floor space and of permitting the preparation of molds and the pouring to be done on either side of the machine, thus avoiding the need of transferring the molding sand, as the preparation of molds and pouring can be shifted from one side to the other whenever the sand supply has been used in the preparation of molds and has accumulated at the opposite side of the machine after casting.

The embodiments of this invention above described exemplify only the forms at present preferred and variations therefrom are contemplated within the scope of the appended claims.

I claim as my invention:

1. In a casting machine, the combination of a revoluble support provided with a seat adapted to successively receive a series of flasks containing the matrix section of a mold, a permanent chill section of a mold forming one wall of a hollow head and supported on a second seat, means for circulating a fluid within said head, and means for causing approach and recession of the seats to close and open the succession of molds formed by said chill section and the respective flasks.

2. In a casting machine, the combination of a support, a chill section of a mold seated on said support, a movable support provided with a plurality of seats adapted to receive the matrix sections of a mold, means for causing intermittent movement of said second support to cause it to bring its seats one by one in position opposite the chill support, and means for causing approach and recession of the chill support and seats in succession, whereby the chill will cooperate with successive matrix sections on the seats to form molds.

3. In a casting machine, the combination of a reciprocable support, a chill section of a mold seated on said support, a revoluble support provided with a plurality of seats each adapted to receive the matrix section of a mold, means for intermittently turning the revoluble support to bring its seats one by one in position opposite the chill support, and means for moving the chill support towards and from the seats, whereby the chill will cooperate with successive pattern sections to form molds.

4. In a casting machine, the combination of a reciprocable support, a chill section of a mold seated on said support, a revoluble support provided with a plurality of seats each adapted to receive the matrix section of a mold, means for moving the chill support towards and from the matrix support and a connection between the two supports for causing rotation of the matrix support when the chill support is reciprocated, whereby the chill will co-operate with successive matrix sections to form molds.

5. In a casting machine, the combination of a reciprocable support, a chill section of a mold seated on said support, a revoluble support provided with a plurality of seats each adapted to receive the matrix section of a mold, means for moving the chill support towards and from the matrix support, a connection between the two supports for causing rotation of the matrix support during retraction of the chill support, and co-operative elements on the supports operative during approach of the chill support for positively aligning the supports, whereby the chill will cooperate with successive pattern sections to form molds.

6. In a casting machine, the combination of a support comprising a hollow head having one of its walls formed by the chill section of a mold, means for supplying a temperature regulating fluid to said head, means for supporting a flask carrying the matrix portion of the mold in co-operative relation with said chill section, and means supporting said flask supporting means for movement in a circle.

7. In a casting machine, the combination of a support including a tube mounted to slide in horizontal bearings and provided with a hollow head, a chill section of a mold seated in vertical position on said head, means for circulating fluid in said tube and head, a cooperating mold section on a second support, and means for moving the first support towards and from the second to close and open the mold.

8. In a casting machine, a reservoir, a tube extending therefrom and terminating in a hollow head having a face forming the chill section of a mold, and means extending within the reservoir and tube for causing circulation of fluid in said head.

9. In a casting machine, a reservoir, a tube extending therefrom and terminating in a hollow head having a face forming the chill section of a mold, means dividing the tube into separate channels which connect in said head, and means for causing fluid in said reservoir to circulate in said channels and head.

10. In a casting machine, the combination of a hollow head having a wall the outer face of which forms one section of a mold, a hollow support carrying said head and forming an extension thereof, and means for circulating a temperature regulating fluid in the support and head.

11. In a casting machine, the combination of a hollow head having an upright wall the face of which forms the chill section of a mold, a hollow support carrying said head and together therewith forming a chamber, and means for supplying a temperature regulating fluid to said chamber.

In testimony whereof I affix my signature.

JUDSON BUCHANAN.